(12) United States Patent
Stanusch et al.

(10) Patent No.: US 6,204,658 B1
(45) Date of Patent: Mar. 20, 2001

(54) METHOD FOR EVALUATING AN OUTPUT SIGNAL OF A ROTATIONAL SENSING DEVICE

(75) Inventors: Gerald Stanusch, Harsum; Hans Holst, Seelze/Velber, both of (DE)

(73) Assignee: Wabco GmbH, Hannover (DE)

( * ) Notice: Subject to any disclaimer, the term of this patent is extended or adjusted under 35 U.S.C. 154(b) by 0 days.

(21) Appl. No.: 09/186,456

(22) Filed: Nov. 5, 1998

(30) Foreign Application Priority Data

Nov. 11, 1997 (DE) .............................................. 197 49 791

(51) Int. Cl.$^7$ ...................................................... G01P 3/481
(52) U.S. Cl. ............................................. 324/166; 324/173
(58) Field of Search ..................................... 324/166, 173

(56) References Cited

U.S. PATENT DOCUMENTS 5,606,252    2/1997    Gschossman et al. ............... 324/166

FOREIGN PATENT DOCUMENTS

| 3010432 | 9/1980 | (DE) . |
|---|---|---|
| 3823295 | 1/1989 | (DE) . |
| 3823478 | 1/1989 | (DE) . |
| 3824713 | 2/1989 | (DE) . |
| 3743958 | 7/1989 | (DE) . |
| 4039521 | 7/1991 | (DE) . |
| 4107777 | 9/1991 | (DE) . |
| 4229301 | 3/1993 | (DE) . |
| 4227113 | 2/1994 | (DE) . |
| 9602359 | 7/1997 | (DE) . |
| 196 02 359 | * 7/1997 | (DE) . |
| 0458121 | 11/1991 | (EP) . |
| 0 589 799 | * 3/1994 | (EP) . |
| 0684480 | 11/1995 | (EP) . |
| WP 86 06172 | * 10/1986 | (WO) . |

* cited by examiner

Primary Examiner—Christine Oda
Assistant Examiner—Henry S. Andersen
(74) Attorney, Agent, or Firm—Proskauer Rose LLP

(57) ABSTRACT

An evaluation method for an output signal of a sensing device for scanning a cyclic movement, consisting of a rotatable pole wheel provided with equidistant teeth and an inductive sensor, permits recognition and display of damage to the pole wheel, in particular defective or missing teeth. Contrary to known evaluation processes, where error monitoring of the output signal is carried out for a relatively short time period comprising few signal cycles of the output signal, an observation of the output signal is effected for a sufficiently long time span in the evaluation process according to the invention, such that within the time span, at least two complete revolutions of the pole wheel are completed. To detect damage to the pole wheel, the sudden changes in the output signal occurring in the course of a complete revolution are recorded and are compared with changes recorded in previous, complete revolutions. If the numbers of changes are in at least approximate agreement, an error signal which can be displayed, for example optically, is produced.

7 Claims, 3 Drawing Sheets

METHOD FOR EVALUATING AN OUTPUT SIGNAL OF A ROTATIONAL SENSING DEVICE

BACKGROUND OF THE INVENTION

The invention relates to a method for evaluating an output signal of a device which senses cyclical motion, in particular, a method applicable to evaluation of an output of a sensing device for determination of rotational speed.

A system employing an evaluation method of this type is disclosed, for example, in EP 0 684 480 A1 (U.S. Pat. No. 5,606,252). The known system evaluates a signal which is emitted by a sensing device used for the determination of the rotational speed of a rotating part. When such devices are used in a vehicle, the rotating parts monitored are generally the wheels, the rotational speeds of which are used, for example, as input signals for an anti-lock brake system (ABS).

In a sensing device upon which the known evaluation method is based, a pulse wheel having a series of teeth is mounted on the rotating part. The pulse wheel, referred to also as a pole wheel particularly in connection with sensing devices employing inductive action, is actively coupled with an inductive sensor attached on a fixed part which inductively produces a periodic signal during rotation of the pole wheel. When the rotational speed remains constant, the signal produced by the sensor has a constant frequency due to an equidistant placement of the teeth on the pole wheel. The actual rotational speed of the rotating part is directly related to the frequency of the inducted signal, which may be determined following suitable conversion.

The above signal is normally transmitted to an electronic control device for evaluation. The evaluation process is then carried out in the form of a program sequence in a microprocessor located in the control device.

In sensor systems of the type described above, damage to the pole wheel may result in generation of irregular signals despite a constant rotational speed of the measured part. A pole wheel may be damaged, for example, as a result of an accident, such that one or more teeth may be missing. Consequently, signal cycles in the output signal of the sensor or in the signal received by the control device will be missing. In accordance with conventional evaluation methods, an undesirable alteration in the rotational speed derived from the received signal may result.

It is therefore an object of the invention to provide a method for evaluating an output signal of a device sensing cyclical motion, in accordance with which abnormal signal evolutions occurring as a consequence of damage to the sensor device are recognized and displayed in a reliable manner.

SUMMARY OF THE INVENTION

In accordance with these and other objects of the invention, there is provided an evaluation method for evaluating an output signal of a sensing device for detection of rotational speed in which the output signal has a periodic time cycle with a predetermined target number of signal periods for each movement cycle. A cycle time value is determined by timely evaluation of signal cycles following each other and a change is noted in the cycle time value or in the speed value derived therefrom. The signal cycles are counted until at least the predetermined target number is reached in order to define a complete movement cycle, and an error signal is produced only when a change in the cycle time value or in the speed value derived therefrom which exceeds a predetermined measure occurring in a complete movement cycle occurs again in a subsequent movement cycle in approximately the same manner.

Contrary to known methods in which an evaluation of an output signal for purposes of recognizing signal abnormalities is carried out for only a relatively short time span comprising few signal cycles, the evaluation method according to the invention takes place over an extended period of sufficient duration to permit at least two complete movement cycles by the rotating part, wherein the completion of an entire movement cycle is effected by counting the signal cycles. Thus, for example, when the invention is used in vehicle technology to determine the rotational speeds of the wheels, the output signal is observed during at least two complete wheel revolutions.

The invention has the advantage that it can be readily implemented in the form of a program sequence in any currently available type of microprocessor. Moreover, since only a minimal amount of memory is required, the invention may be used with inexpensive microprocessors of very simple design.

The evaluation method in accordance with the invention provides the further advantage that damage of a diverse nature, or other kinds of defects present in the sensing device, can be recognized in a reliable manner. Thus, in addition to recognizing the presence of a single defect in the form, for example, of a missing tooth on a pole wheel, the method is equally effective in identifying any cyclically repeated signal abnormalities as malfunctions. However, in accordance with the invention, sporadic interferences with signals which occur in practice, and which can therefore be tolerated, do not lead to error detection.

In an advantageous further embodiment of the invention, the number of signal cycles is determined during an observation cycle in order to allow proper evaluation. The observation cycle (which, as explained below, differs from the evaluation method) is selected so that it is long enough to comprise several signal cycles, but at the same time being substantially shorter than a complete movement cycle. Using the number of signal cycles thus obtained, and taking into account the length of the observation cycle, a short-term mean value of the cycle time of the signal cycles can then be determined. This mean value can then be used advantageously for the recognition of damages to the sensing device resulting in relatively considerable interference, in particular with signal sequences with frequent, small errors.

The applicability of the invention to the most varied types of sensing systems is yet another of its advantages. Thus, in addition to use of the method in conjunction with the already described inductively functioning sensing systems, the method in accordance with the invention could also be used to evaluate an optical sensing system, for example operating with a reflected-light barrier or a forked light barrier and a pulse wheel, instead of a pole wheel. In such optical sensing devices, dirt, or other form of optical obscurement, may result in undesirable, cyclically recurring signal interferences.

In an advantageous further embodiment of the invention, the movement cycle described above, which comprises a target number of signal cycles determined by the design of a particular sensing device, is replaced by a monitoring cycle (defined below) for the production of the error signal. In accordance with the embodiment, the error signal is generated only when changes in the cycle time value, or the speed value derived therefrom during a complete monitoring cycle, which exceed a predetermined measure, and which have already occurred during at least one preceding complete monitoring cycle, occur again in the same or nearly same manner. Such a monitoring cycle comprises a multiple of the target number of signal cycles of a movement cycle. By virtue of the longer monitoring cycle, the embodiment provides the advantage that reliable generation of the error signal is ensured even for signal interferences in the sensor signal which are close to the trigger threshold of the sensing device and therefore occur only sporadically.

In a particularly advantageous embodiment, the monitoring cycle comprises an integral multiple of the target number of signal cycles of a movement cycle, i.e. the monitoring cycle comprises several complete movement cycles.

When the invention is applied in practice to vehicle technology, for example in combination with sensing systems of the type described above for the determination of the rotational speed of vehicle wheels, pole wheels with different numbers of teeth are used depending on vehicle model or tire size. The number of different pole wheels that can possibly be used in this regard is generally known, however, the determination of which particular pole wheels out of these choices will actually be used is often first made when the vehicle is put into operation, and is therefore not always known in advance.

In an advantageous further embodiment of the invention, observation and counting of the signal cycles to recognize a complete movement cycle therefore is continued for a certain period until a number of signal cycles equal to the smallest common multiple of the number of pole wheel teeth of the various pole wheels under consideration have occurred. Reliable error detection is thereby possible even in applications involving pole wheels having different numbers of pole wheel teeth without the requirement of great expense, and most importantly, without any manual adaptation, for example, implementation of a change in the control program of the control device carrying out the evaluation program.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
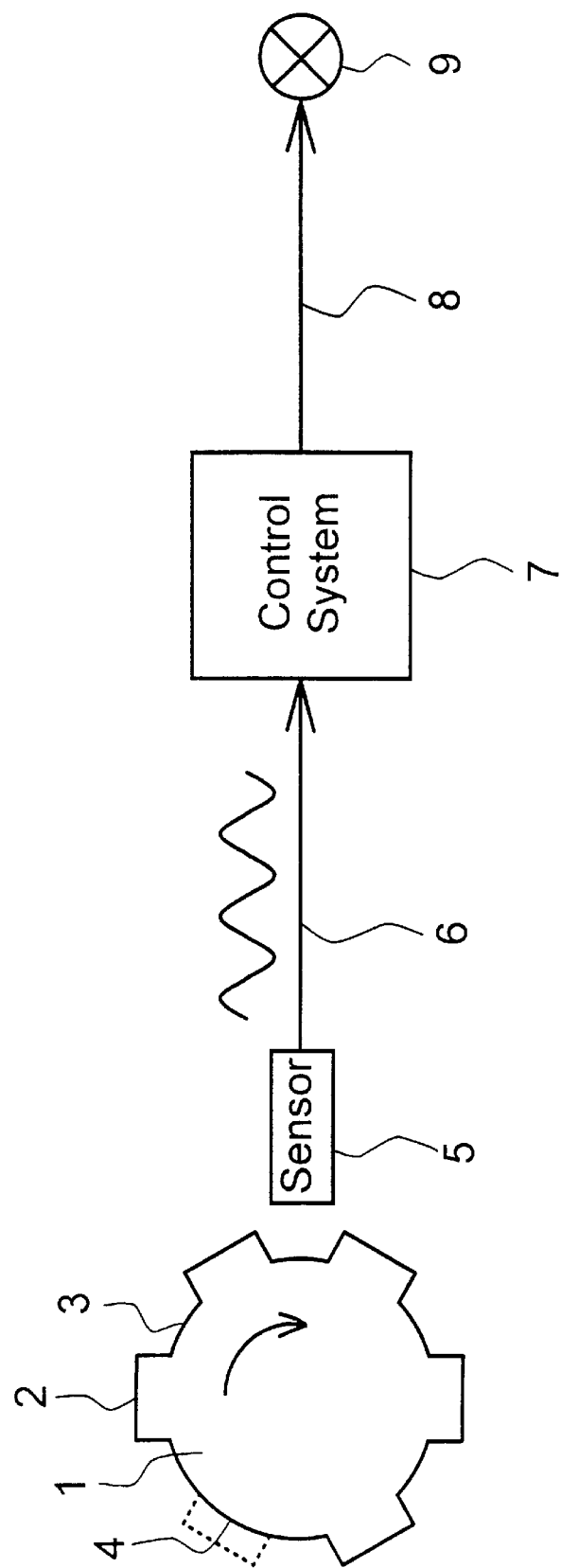
FIG. 1 is a schematic representation of a rotational sensor in communication with a device for implementing an evaluation method in accordance with the invention.

Referring now to the figures, and in particular FIG. 1, a preferred application of the method according to the invention is illustrated. In the depicted drawing, a system utilizing the method of the invention includes a rotatable pole wheel 1, a sensor 5 positioned to scan the rotational movement of pole wheel 1, an electronic control system 7 which serves as a device to carry out the method, and a lamp 9 serving as a display element for an error signal.

Pole wheel 1 and sensor 5 together constitute an inductively acting sensing system of known design, such as is used for example to sense the rpm's of vehicle wheels for anti-lock brake systems (ABS). Pole wheel 1 is comprised of a magnetically conductive material, for example, steel, and sensor 5 is provided with at least one permanent magnet and one electrical coil (neither of which are shown for simplicity of illustration).

On the outside circumference of the pole wheel 1, a series of teeth 2 in the form of alternating raised points separated from one another by tooth intervals 3, are arranged at equal distances from each other. A missing tooth caused by damage to pole wheel 1, which should properly be present for uniform signal transmission, is represented at a location 4 on the outer circumference of pole wheel 1 by a broken line in FIG. 1.

As pole wheel 1 rotates at a constant speed, sensor 5 transmits a cyclic signal to control system 7 via a signal path 6, provided for example in the form of an electric circuit. In the present example, the design of the sensing device provides a target number of six signal cycles per revolution of pole wheel 1. Because of the missing tooth at location 4 however, one signal cycle is not produced during rotation. The cyclic signal thus has a regularly recurring cycle in which four signal cycles with uniform, short cycle time are followed by one signal cycle with a longer cycle time.

Control system 7 is equipped with a microprocessor to carry out the evaluation process according to the invention. The signal transmitted by sensor 5 via signal path 6 is either transmitted directly to the microprocessor in form of an input signal, or is converted by an evaluation circuit of known design upstream of the microprocessor into a signal that can be used by the microprocessor. The microprocessor is thereby able to measure the cycle time of arriving signal cycles and evaluate them by means of its control program.

In an advantageous embodiment, control system 7 is additionally equipped with a non-volatile parameter memory connected to the microprocessor, which can be optionally read from or written into, for the storage of the target number of signal periods to be considered for a particular pole wheel being used. Control system 7 can thereby be flexibly adapted to different system requirements.

By using the evaluation method according to the invention, which will be explained in further detail with reference to FIGS. 2 and 3, damage to pole wheel 1, such as a missing tooth, can be recognized and displayed by an optical or acoustical signal. For this purpose, control system 7 is provided with controls connected to the microprocessor on its output side, utilizing for example a transistor, by means of which lamp 9, serving as an error indicator, can be activated via a signal path, for example in form of an electric cable 8.

The above-mentioned parts such as the microprocessor, evaluation circuit or output controls provided in the control device are not depicted in FIG. 1, insofar as these component parts are of known design and are not therefore explained in further detail herein.

Figure 2:
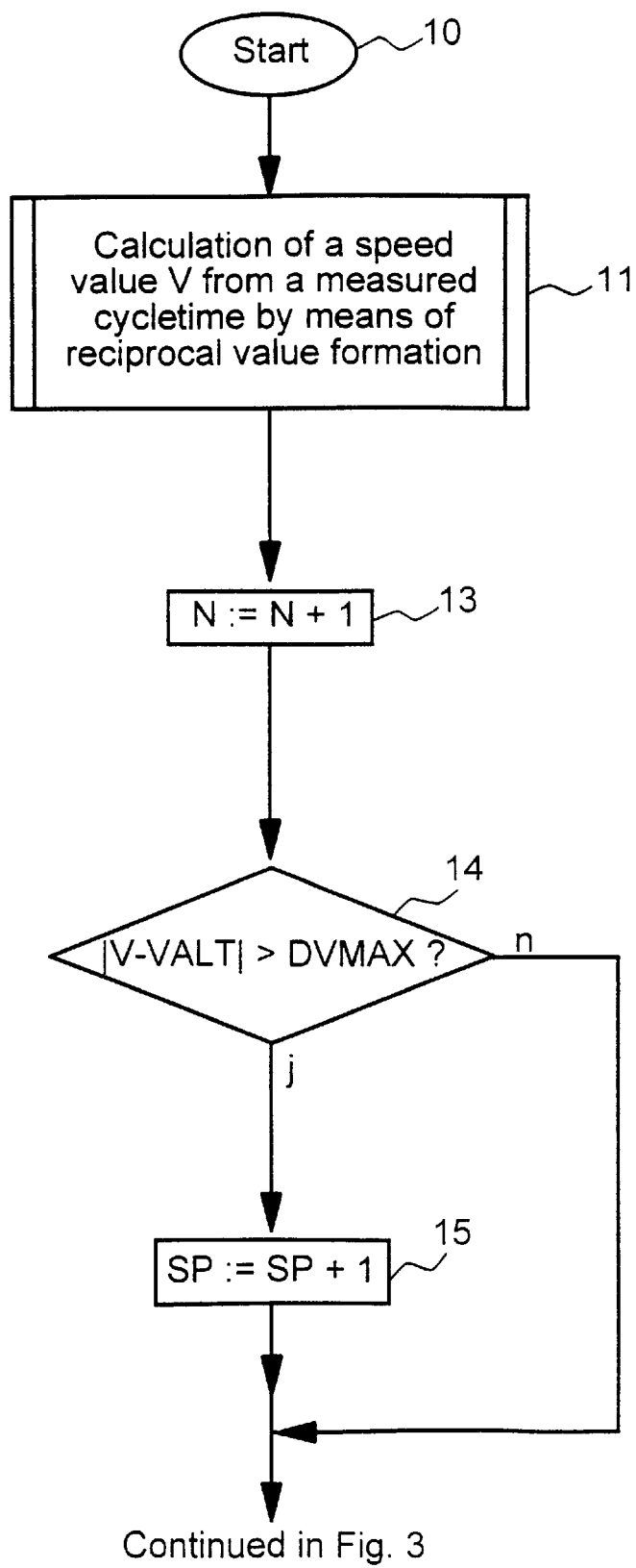
FIG. 2 is a flow chart depicting a portion of the steps of a preferred embodiment of the evaluation method according to the invention.
Figure 3:
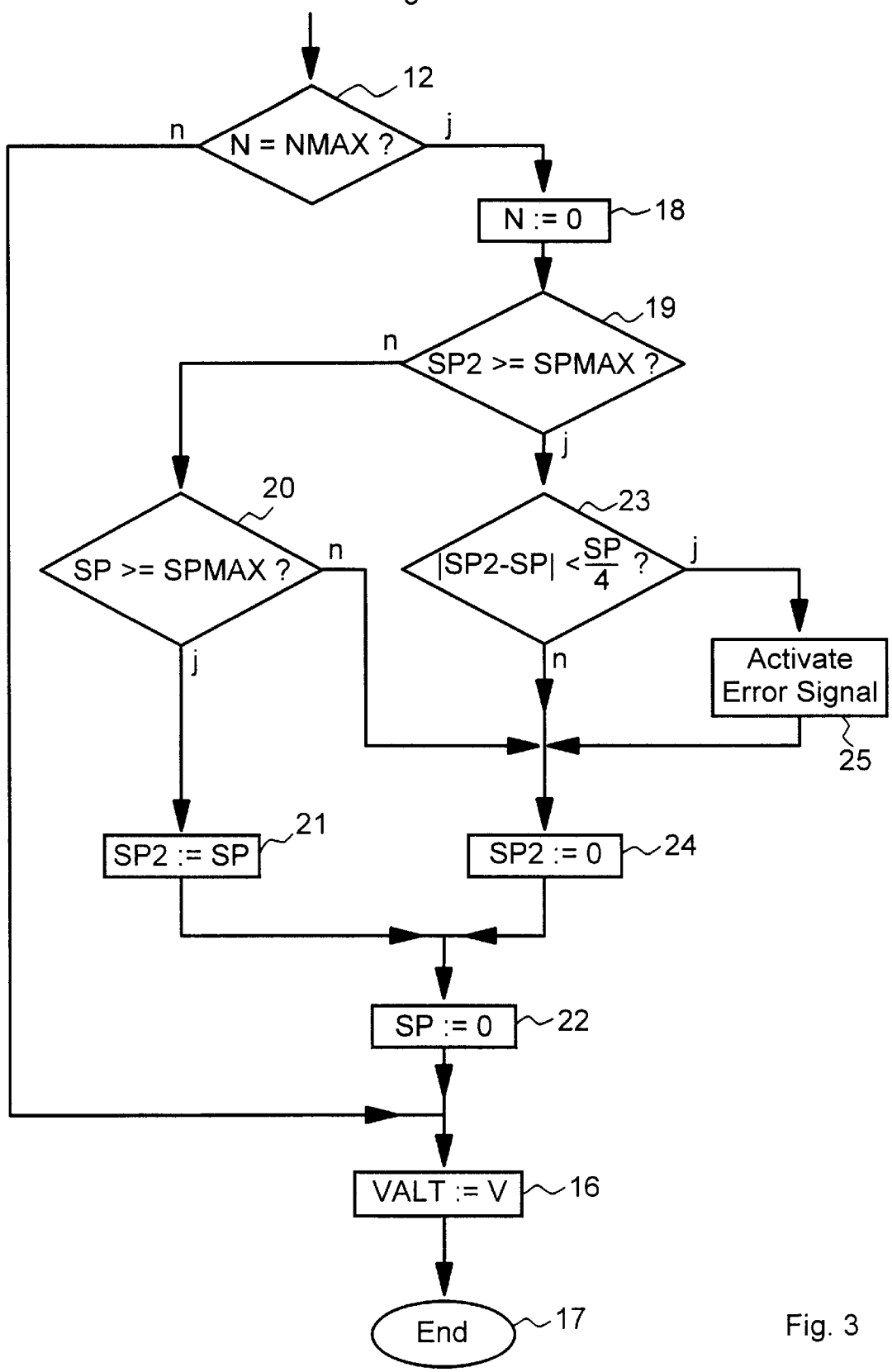
FIG. 3 is a flow chart depicting a continuation of the steps of the evaluation method of FIG. 2.

A further description of a preferred embodiment of the evaluation method according to the invention is shown with reference FIGS. 2 and 3, in a corresponding segment of the control program executed by the microprocessor, in the form of a flow chart. Each program segment is carried out following reception of a signal cycle, and begins in FIG. 2 with a block 10.

In a sub-program block 11 which follows block 10, a speed value V is calculated from the last measured value of the cycle time by formation of a reciprocal value. In practice, speed value V is generally produced directly by dividing a division constant by the cycle time. All conversion factors required for a correct representation of speed value V in a desired physical unit, for example Km/h, are united in the division constant.

In a sub-program of this type, it is furthermore customary in practice to provide program steps for direct measurement of the cycle time of the signal cycles. Such program steps may contain a timer control, an interrupt control and program steps for the processing of the time data generated by the microprocessor. These program steps are known in detail to persons trained in the art, or if necessary can be found in the data manual for the given microprocessor.

Following sub-program block 11, a counter N for counting the received signal cycles is incremented by one in a process block 13.

The program then checks whether the speed value V determined in sub-program block 11 has changed by a relatively large, and therefore implausible, amount in a decision block 14. For this determination, a change in speed is calculated by the difference between the speed value V and a speed value VALT which has occurred earlier and was determined on the basis of a previously occurring signal cycle, the result being compared with a highest admissible value DVMAX. If it is determined that the change in speed value |V-VALT| exceeds the highest admissible limit value DVMAX, damage to pole wheel 1 is suspected. This is recorded in a process block 15 by incrementation of a suspicion counter SP and is stored for later evaluation. If however the amount of the speed change |V-VALT| examined in decision block 14 is less than the previously mentioned highest admissible limit value DVMAX, process block 15 is skipped for lack of suspected damage to pole wheel 1.

Following this step, the program continues with the program steps shown in FIG. 3.

The program then verifies in a decision block 12 whether one or several complete revolutions of pole wheel 1 should properly be assumed because of the signal cycles having occurred until then. For this, counter N is checked to determine whether a predetermined maximum value NMAX has been attained. If maximum value NMAX has not yet been reached, program steps 18 to 25 are skipped to a process block 16, in which the currently found speed value V is stored as speed value VALT. The process then ends with a block 17.

If however the counter N and the predetermined maximum value NMAX are found to agree in decision block 12, this is seen as a sign for the end of a monitoring cycle, since a predetermined number of signal cycles, indicating one or several complete revolutions of the pole wheel 1, was received. The target number of signal periods of the particular pole wheel can be used as maximum value NMAX. In the illustrated embodiment of FIG. 1, for example, NMAX could therefore have a value of 6. It is also possible to extend a monitoring cycle to several revolutions of pole wheel. For example, with 10 revolutions, NMAX would be 60. In this manner, recognition of damage to the pole wheel can be reliably obtained. This is particularly advantageous when there is strong interference in the signals.

In applications in which pole wheels with different numbers of teeth are selectively utilized, for example various pole wheels having 6, 8 and 9 teeth, the maximum value NMAX selected is advantageously the smallest common multiple of the various numbers of teeth on each pole wheel, i.e. in the above example, NMAX would be 72. A combination with the previously described expansion of a monitoring cycle to several revolutions of pole wheel 1 is also advantageous.

Upon detecting the agreement of the counter N with the predetermined maximum value NMAX in decision block 12, the counter N is immediately reset in a process block 18 to its starting value of 0.

In the presently described embodiment, two monitoring cycles must be conducted to recognize damage to pole wheel 1, whereby the suspicion counter SP must reach at least a predetermined suspicion value SPMAX in every monitoring cycle, and the found suspicion counter values of the two monitoring cycles must at least nearly agree.

When the maximum value NMAX selected is a multiple of the target number of signal periods of a particular applicable pole wheel, the predetermined suspicion value SPMAX is primarily used as a plausibility control. In such case, a signal error produced by an abnormality of pole wheel 1, and recurring at every revolution of the pole wheel, would cause a counter state in the suspicion counter SP after a certain number of pole wheel revolutions which would agree with this number of pole wheel revolutions, on condition that the speed modification caused by the abnormality is sufficiently great. Therefore the number of pole wheel revolutions selected for one monitoring cycle is preferably used as the suspicion value SPMAX.

A memory SP2 is provided to compare the value of the suspicion counter SP with a suspicion counter value determined in a previous monitoring cycle. This memory SP2 is further used to differentiate between the monitoring cycles. A verification is therefore made in a decision block 19 whether a value reaching the predetermined suspicion value SPMAX is already present in the memory SP2. Since such a value can be present in the memory SP2 only as a result of a previous monitoring cycle, the program continues with a decision block 20 provided for a first monitoring cycle if the verification result in decision block 19 is negative.

The program verifies in decision block 20 whether the suspicion counter SP determined in blocks 14, 15 has attained the predetermined suspicion value SPMAX. If a positive determination is made, the suspicion counter SP is stored in a process block 21 in the memory SP2 to be later checked in a second monitoring cycle. Otherwise, the memory SP2 is set to a neutral value 0 in a process block 24.

In either case the suspicion counter SP is then reset to its starting value 0 in a process block 22. Process block 16 then sets the speed value VALT to the current speed V as described above, and the method then ends in a block 17.

When a value in the memory SP2 which reaches the predetermined suspicion value SPMAX is ultimately ascertained in decision block 19, the program verifies in a subsequent decision block 23 whether an at least approximate agreement between the suspicion counter SP and the memory SP2 exists. As a criterium for the approximate agreement of these two values, the program tests whether the value contained in the memory SP2 deviates from the suspicion counter SP in either direction by more than one quarter of the value of the suspicion counter SP. If no such deviation is found, it can be assumed with high probability that the sudden changes in the speed value V determined in decision block 14 are not caused by random, sporadic interferences, but that the changes in the speed value V show a certain regularity. Therefore, in such case, the program branches to a block 25, in which an error signal is actuated by means of which the lamp (9) is switched on to signal an error condition by means of the previously described design of the control system 7.

Following this, the memory SP2 in process block 24, and the suspicion counter SP in process block 22, are reset to their initial value 0. Blocks 16, 17 follow, the steps carried out as described above.

The method described in the above example, in which the results from two monitoring cycles are compared with each other for the recognition of an error, may of course advantageously contain also yet a third or additional monitoring cycles. In such case, the results from all of the monitoring cycles can be checked for at least a near agreement in order to recognize an error due to pole wheel damage. It is also possible to select several of the results of the monitoring cycles, eliminate the least likely results, and then check the remaining results for exact agreement with each other. Such measures serve to avoid unwanted error detection and display, especially in case of a higher probability of sporadic errors in the generated sensing signal.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for evaluating an output signal of a sensing device for detection of rotational speed in which the output signal has a periodic time cycle with a predetermined target number of signal periods for each movement cycle, comprising the steps of:

determining a cycle time value by timely evaluation of signal cycles following each other and by counting the number of signal cycles during an observation period;

noting a change in the cycle time value;

counting the signal cycles until at least the target number is reached in order to ascertain a complete movement cycle; and producing an error signal on condition that a change in the cycle time value or in a speed value derived therefrom exceeding a predetermined measure which occurs in a complete movement cycle occurs again in a subsequent movement cycle in approximately a same manner.

2. A method according to claim 1, wherein the cycle time value is determined by measuring a cycle time of the signal cycles during the observation period.

3. A method according to claim 2, wherein the cycle time value is converted by means of reciprocal value formation into a speed value.

4. A method according to claim 3, wherein sudden speed changes which exceed a predetermined highest admissible value are used as a measure of said change in the cycle time value.

5. A method according to claim 1, wherein the sensing device includes a pulse wheel and a pulse sensor.

6. A method according to claim 1, wherein a monitoring cycle is set which comprises at least one complete movement cycle;

the signal cycles are counted until at least a predetermined maximum value is reached in order to obtain one complete monitoring cycle, the maximum value being a multiple of target number of signal cycles characterizing one complete movement cycle; and the error signal is generated only if the change in the cycle time values which have already occurred in at least an approximately identical manner in at least one previous complete monitoring cycle, and which exceed a predetermined highest admissible value, occur again in a subsequent monitoring cycle.

7. A method according to claim 1, wherein:

the target number of signal periods can be selected from a finite number of selected target numbers; and the signal cycles are counted until at least the lowest common multiple of the elements of a quantity of the target numbers has been reached to obtain one complete movement cycle.

* * * * *